G. WEINBEER.
MALT TURNING APPARATUS.
APPLICATION FILED MAY 4, 1910.

991,916.

Patented May 9, 1911.
3 SHEETS—SHEET 1.

Witnesses:
Corinne Myers.
Thomas Donnellan.

Inventor:
Gregor Weinbeer
by L. K. Böhm,
Attorney.

G. WEINBEER.
MALT TURNING APPARATUS.
APPLICATION FILED MAY 4, 1910.
991,916.
Patented May 9, 1911.
3 SHEETS—SHEET 2.
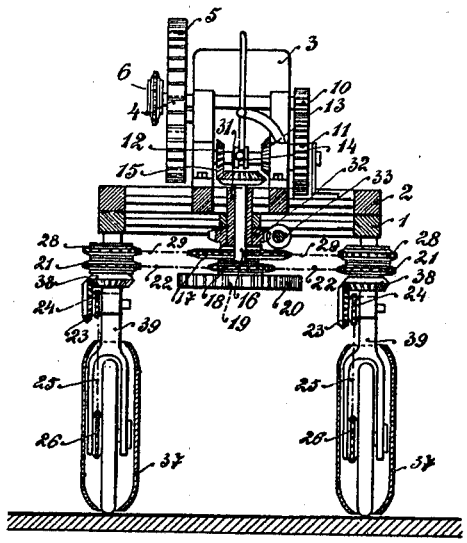
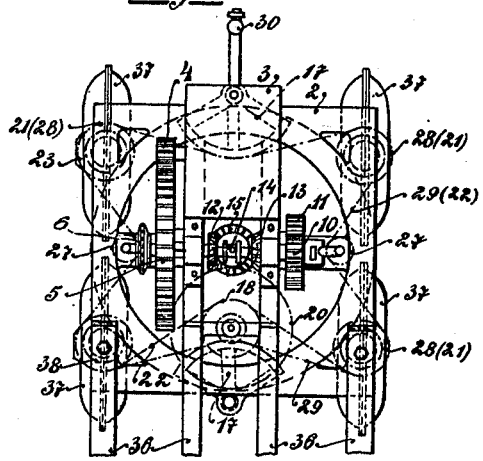
Witnesses:
Corinne Myers.
Thomas Donnellan.
Inventor:
Gregor Weinbeer
by L. K. Böhm,
Attorney.

G. WEINBEER.
MALT TURNING APPARATUS.
APPLICATION FILED MAY 4, 1910.

991,916.

Patented May 9, 1911.

3 SHEETS—SHEET 3.

Witnesses:
Corinne Myers
Thomas Donnellan

Inventor:
Gregor Weinbeer
by L. K. Böhm,
Attorney.

UNITED STATES PATENT OFFICE.

GREGOR WEINBEER, OF NUREMBERG, GERMANY, ASSIGNOR TO NÜRNBERGER MECHANISCHE GRÜNMALZWENDERANLAGEN G. M. B. H., OF NUREMBERG, GERMANY.

MALT-TURNING APPARATUS.

991,916.  Specification of Letters Patent.  Patented May 9, 1911.

Application filed May 4, 1910. Serial No. 559,313.

*To all whom it may concern:*

Be it known that I, GREGOR WEINBEER, a subject of the German Emperor, residing at Nuremberg, Mittelfranken, Bavaria, Germany, have invented a certain new and useful Improvement in Malt-Turning Apparatus, of which the following is a specification.

This invention relates to devices for turning over germinating and other grain and more particularly barley on malting floors. Such devices are generally arranged so that they are adapted to move about on a network of rails arranged at a distance above the barn floor, the devices therefore depending from the rails and operating in such position. A rail installation of this kind is very expensive, since it must be constructed in such a manner that the vehicle carrying the turning implements can travel over all parts of the floor.

The object of the present invention is to render the use of rails unnecessary and turn over the germinating beds, from a vehicle traveling on the floor itself. Considerable difficulties arise to prevent the success of such a device, for in the first place, the vehicle must be able to travel in all directions, so that the whole floor can be traversed, secondly, the arms carrying the shovels for turning over the beds must be adjustable to correspond with the direction of travel at any moment, and thirdly, care must be taken that the germinating material is not crushed by the wheels of the vehicle.

These difficulties are successfully overcome by the present invention which consists in connecting the transporting wheels with the shaft of a driving motor and also in interconnecting such wheels with one another, the wheels being preferably surrounded by a casing which presses on the malting floor.

Figure 1:
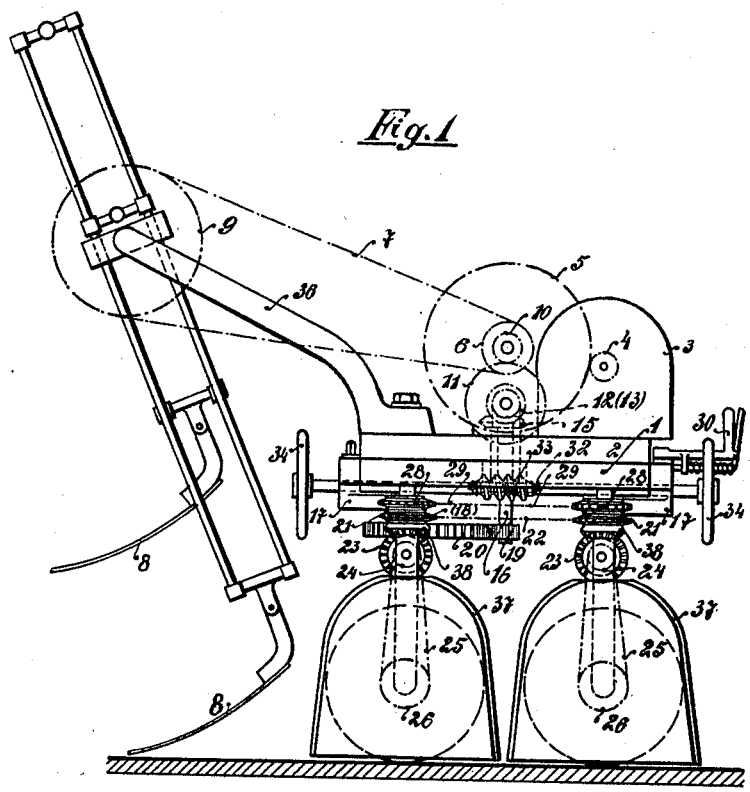
Figure 4:
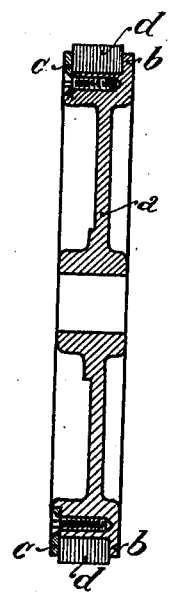
Figure 5:
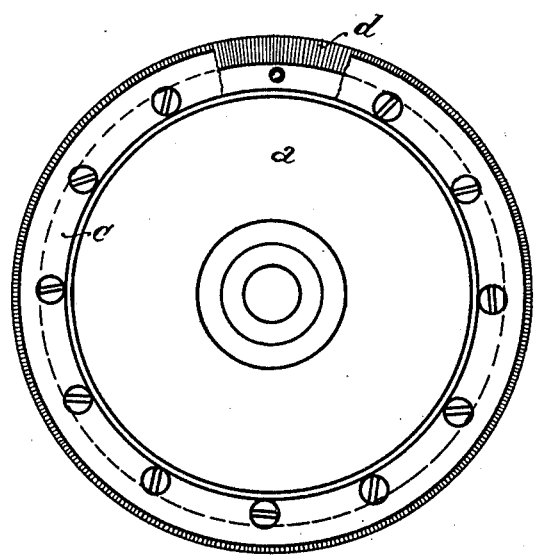

Reference will now be made to the accompanying drawing, in which,

Figure 1 is a side elevation of a turning over device according to the invention, Fig. 2 is a cross section, Fig. 3 is a plan view, and Figs. 4 and 5 are a cross section and side elevation respectively of one wheel of the device.

Upon the frame, 1, of the vehicle, carried by the wheels, rests a movable frame, 2, which carries not only the driving mechanism for the turning implements but also that for the wheels of the vehicle. The chain wheel, 9, which effects the motion of the shovels, 8, is driven from the motor, 3, through the intermediary of the toothed wheels, 4 and 5, and the chain, 7. The toothed wheel, 10 which meshes with the wheel, 11, is mounted on the shaft of the chain wheel, 6. Upon the shaft of the wheel, 11, are situated the bevel wheels 12, 13, of which, by means of the coupling, 14, provided between them, one or the other can be brought into engagement with the bevel wheel, 15, for the purpose of effecting a reversal in the direction of travel. The bevel wheel, 15, is mounted upon a vertical shaft, 16, which carries at its lower end the toothed wheel, 19. The latter meshes with the wheel, 20, which is rigidly connected with the chain wheel, 18, from which the driving of the wheels is effected. For this purpose, there are mounted on the rods, 39, belonging to the forks which carry the wheels, freely rotatable chain wheels, 21, which together with the chain wheel, 18, are all driven by means of a chain, 22. The chain wheels, 21, are rigidly connected with the bevel wheels, 38, the rotation of which is transferred to the axles of the wheels through the intermediary of the bevel wheels, 23, the chain wheels, 24, the chain, 25, and the chain wheels 26.

In order to be able to tighten the chains, two trunnion rollers, 27 (Fig. 3) are provided on the vehicle. The chains are tightened by the rollers 27 by moving same toward one another. To render this possible the shafts of the rollers are guided in slots as is apparent from Fig. 3. Chain wheels 28, are fitted to the rods of the wheel forks, the wheels being in engagement with a chain 29, the links of which are in mesh with toothed segments, 17, one of which is under the control of a lever, 30. By turning this lever the chain 29 is moved and the rods 39 on the various wheel forks are all simultaneously adjusted. This does not however interfere with the driving of the transport wheels, since this is effected by the chain wheels, 21, mounted axially to the wheel fork rods, as well as by the bevel wheels 38.

To enable the frame, 2, to be rotated on the frame 1 a sleeve 31 on the shaft 16 is connected to the frame, 2, and at the lower end of this sleeve is mounted a worm wheel 32, with which meshes a worm 33, carried upon a shaft which is journaled in the vehicle frame 1. The ends of the worm shaft are provided with hand wheels, 34, by means of which the worm wheel 32, and the frame 2 may be rotated. On the rotation of the frame 2 the arms 36, carrying the turning shovels, 8, also swing around whereby operation on all sides of the vehicle is rendered possible.

In order to prevent the germinating material from being crushed by the wheels when the vehicle is driven over the floor, the wheels are inclosed by casings, 37, lying next to the chain wheels 26. To enable the casings to penetrate easily through the bed of germinating material, they are tapered at their front and rear ends.

It is self-evident that the driving of the transport wheels could be effected from the chain wheels, 21, by means of a tooth wheel gearing instead of by the chain gear 24, 25, 26.

To prevent the transport wheels from slipping, owing to the great resistance exerted against the wheel casings, due to the germinating materials which lie on a smooth floor, constructed of cement or stone, and moistened and made slippery by the germinating mass, the wheels are fitted as shown in Figs. 4 and 5 with treads comprising radially arranged pieces of wire, or sheet iron disks.

One side of the wheel body *a* is provided with an integral flange, *b*, and the other side has a removable flange, *c*. Between the flanges is tightly held the rim, *d*, of the wheel, consisting of single pieces of wire or sheet iron disks, arranged radially. The rim of the wheel is preferably divided into various segments, the wires or pieces of sheet iron of which are soldered or otherwise connected together at their inner ends. Owing to the relatively sharp edges of the pieces of wire, and the sheet iron disks, the rims of the wheels have a high frictional resistance on the floor, whereby slipping of the wheels is avoided and the device is enabled to travel easily through the bed of germinating material.

I claim as my invention:

1. Apparatus for the purpose hereinbefore described, comprising in combination, a vehicle frame, transport wheels therefor, forks for supporting the wheels, chain wheels loose on the forks for driving the transport wheels, a motor on the frame, a chain in working engagement with all the chain wheels and driven by the motor, and means for steering the vehicle.

2. Apparatus for the purpose hereinbefore described, comprising in combination, a vehicle frame, transport wheels therefor, forks for the wheels, a shaft extension, on each fork, a chain wheel loosely mounted on each extension for driving the corresponding transport wheel, a motor on the frame, a chain driven by the motor and in working engagement with all the chain wheels, and means for steering all the transport wheels simultaneously.

3. Apparatus for the purpose hereinbefore described, comprising in combination, a vehicle frame, transport wheels therefor, forks for the wheels, a shaft extension on each fork, two chain wheels on each fork, one loose and one fast thereon, means for simultaneously driving all the loose chain wheels, means whereby the loose wheels may drive the transport wheels, a chain in working engagement with all the fast chain wheels and an operable toothed segment engaging with the chain for the purpose of adjusting it and the various chain wheels in connection therewith to steer the vehicle.

4. Apparatus for the purpose hereinbefore described, comprising in combination, a vehicle frame, transport wheels, forks for the wheels, a shaft extension on each fork, two chain wheels on each fork, one fast and one loose thereon, a chain in working engagement with each set of chain wheels, a motor for driving one chain for the purpose of driving the transport wheels through the loose chain wheels, and an operable toothed segment in engagement with the other chain for steering the transport wheels through the fast chain wheels.

5. Apparatus for the purpose hereinbefore described, comprising in combination, a vehicle frame, transport wheels therefor, a motor and shaft for propelling the vehicle in driving connection with the wheels and means for interconnecting the wheels with one another and a casing for inclosing each transport wheel, the lower edge of the casing making contact with the surface over which the vehicle is traveling.

6. Apparatus for the purpose hereinbefore described, comprising in combination, a vehicle frame, transport wheels therefor, a motor and shaft for propelling the vehicle in driving connection with the wheels, means for interconnecting the wheels with one another, a casing inclosing each transport wheel, and a metallic gripping tread on each transport wheel.

7. Apparatus for the purpose hereinbefore described, comprising in combination, a vehicle frame, transport wheels therefor, a motor and shaft for propelling the vehicle in driving connection with the wheels, means for interconnecting the wheels with one another, a casing inclosing each transport wheel, and a tread surface on each transport wheel comprising thin metallic members arranged radially.

8. Apparatus for the purpose hereinbefore described, comprising in combination, a vehicle frame, transport wheels therefor, a motor and shaft for propelling the vehicle in driving connection with the wheels, means for interconnecting the wheels with one another, a casing for each transport wheel, a tread surface on each latter wheel comprising thin metallic members arranged radially, and a removable and a fixed flange on each wheel body to hold the tread in position.

9. Apparatus for turning over germinating and other grain, comprising in combination, a vehicle frame, transport wheels therefor, forks for the wheels, a shaft extension on each fork, two chain wheels on each fork, one fast and one loose thereon, a chain in working engagement with each set of chain wheels, a motor for driving one chain for the purpose of driving the transport wheels through the loose chain wheels, an operable toothed segment in engagement with the other chain for steering all the transport wheels through the fast chain wheels, a casing inclosing each transport wheel and a brush-like gripping tread to each transport wheel.

10. Apparatus for turning over germinating and other grain, comprising in combination, a vehicle frame, transport wheels therefor, forks for the wheels, a shaft extension on each fork, two chain wheels on each fork, one fast and one loose thereon, a chain in working engagement with each set of chain wheels, a motor for driving one chain for the purpose of driving the transport wheels through the loose chain wheels, an operable toothed segment in engagement with the other chain for steering all the transport wheels through the fast chain wheels, a casing inclosing each transport wheel the lower edge of which casing is in contact with the surface over which the vehicle is traveling and a tread surface to each transport wheel comprising thin radially arranged metallic elements.

In testimony whereof I have affixed my signature in presence of two witnesses.

GREGOR WEINBEER.

Witnesses:
 OSCAR BOCK,
 HANS SCHODER.

---

Copies of this patent may be obtained for five cents each, by addressing the "Commissioner of Patents, Washington, D. C."